United States Patent
Kannan et al.

(10) Patent No.: US 9,053,430 B2
(45) Date of Patent: Jun. 9, 2015

(54) METHOD AND APPARATUS FOR INFERRING LOGICAL DEPENDENCIES BETWEEN RANDOM PROCESSES

(71) Applicant: QUALCOMM Incorporated, San Diego, CA (US)

(72) Inventors: Sreeram Kannan, San Diego, CA (US); Thomas Zheng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 13/746,348

(22) Filed: Jan. 22, 2013

(65) Prior Publication Data

US 2014/0143185 A1   May 22, 2014

Related U.S. Application Data

(60) Provisional application No. 61/728,022, filed on Nov. 19, 2012.

(51) Int. Cl.
*G06N 3/04* (2006.01)
*G06N 7/00* (2006.01)
*G06N 3/08* (2006.01)

(52) U.S. Cl.
CPC *G06N 3/049* (2013.01); *G06N 3/08* (2013.01); *G06N 3/082* (2013.01); *G06N 7/005* (2013.01)

(58) Field of Classification Search
None
See application file for complete search history.

(56) References Cited

U.S. PATENT DOCUMENTS

| | | |
|---|---|---|
| 2009/0327195 A1 | 12/2009 | Iscen |
| 2011/0010693 A1 | 1/2011 | Kahlon |
| 2011/0112998 A1 | 5/2011 | Abe et al. |
| 2011/0167031 A1 | 7/2011 | Kleinberg et al. |

FOREIGN PATENT DOCUMENTS

WO   2011103526 A2   8/2011

OTHER PUBLICATIONS

Kwon, et al., Resilient Localization for Sensor Networks in Outdoor Environments, ACM Transactions on Sensor Networks, vol. 7, No. 1, Article 3, Publication date: Aug. 2010, pp. 1-30.*
Granger C.W.J. "Investigating Causal Relations by Econometric Models and Cross-spectral Methods", 1969, Econometrica 37 (3), pp. 424-438.
Bamford S.A., et al., "Synaptic rewiring for topographic mapping and receptive field development", NEURAL NETWORKS, vol. 23, No. 4, Feb. 10, 2010, pp. 517-527, XP055100783, DOI: 10.1016/j.neunet.2010.01.005 Sections 2 and 3.

(Continued)

*Primary Examiner* — Wilbert L Starks
(74) *Attorney, Agent, or Firm* — Rupit M. Patel

(57) ABSTRACT

Certain aspects of the present disclosure relate to methods and apparatus for inferring causal relationship between random processes using a temporal learning algorithm. The temporal learning algorithm determines structure of a causal graph with a set of nodes. Input to the nodes may be binary time series (e.g., random processes). The output of the temporal learning algorithm may be a labeled directed graph in which the direction of the connection between each two node indicates causal direction and the strength of connectivity between the nodes indicates intensity of the causal influence. The temporal learning algorithm may iteratively update strength of connections between nodes to track variations in real time.

30 Claims, 14 Drawing Sheets

(56) References Cited

OTHER PUBLICATIONS

Clopath C., et al., "Connectivity reflects coding: a model of voltage-based STDP with homeostasis", NATURE NEUROSCIENCE, vol. 13, No. 3, Jan. 24, 2010, pp. 344-352, XP055071136, DOI: 10.1038/nn.2479 Discussion Online methods.

Froelich W., et al., "Mining temporal medical data using adaptive fuzzy cognitive maps", Proceedings of the 2nd Conference on Human System Interactions (HSI'09), May 21, 2009, pp. 16-23, XP031478046, DOI: 10.1109/HSI.2009.5090946 sections 11-1V.

Gao Y., et al., "Online learning of causal structure in a dynamic game situation", Proceedings of the 34th Annual Meeting of the Cognitive Science Society (COGSCI'12), Aug. 1, 2012, pp. 372-377, XP055131997, ISBN: 978-0-9768318-8-4 the whole document.

International Search Report and Written Opinion—PCT/US2013/070698—ISA/EPO—Aug. 6, 2014.

Kasabov N., et al., "To spike or not to spike: a probabilistic spiking neuron model", NEURAL NETWORKS, vol. 23, No. 1, Sep. 6, 2009, pp. 16-19, XP026788895, DOI: 10.1016/j.neunet.2009.08.010 sections 2 and 4.

Ramachandran S., et al., "Refinement of Bayesian networks by combining connectionist and symbolic techniques", Thesis proposal for Doctor of Philosophy at University of Texas, Oct. 20, 1995, XP055132135, Retrieved from the Internet: URL:http://www.cs.utexas.edu/ml/papers/banner-proposal-95.pdf [retrieved on Mar. 6, 2004] the whole document.

* cited by examiner

|  | Original Value | Inferred Value |
|---|---|---|
| $\beta_{12}$ | 0.5 | 0.77 |
| $\beta_{13}$ | 0.8 | 0.83 |
| $\beta_{24}$ | 0.6 | 0.58 |
| $\beta_{34}$ | 0.6 | 0.64 |
| $\beta_{41}$ | 0.8 | 0.72 |
| $\beta_{23}$ | 0 | 0.02 |
| $\beta_{32}$ | 0 | 0.03 |

FIG. 6

| Necessary Cause C1 | Sufficient Cause C2 | Effect E |
|---|---|---|
| 0 | 0 | 0 |
| 0 | 1 | 1 (C2 given priority) <br> 0 (C1 given priority) |
| 1 | 0 | 1/0 (do not care) |
| 1 | 1 | 1 |

FIG. 7

METHOD AND APPARATUS FOR INFERRING LOGICAL DEPENDENCIES BETWEEN RANDOM PROCESSES

CLAIM OF PRIORITY UNDER 35 U.S.C. §119

The present Application for Patent claims priority to Provisional Application No. 61/728,022 entitled "METHOD AND APPARATUS FOR INFERRING LOGICAL DEPENDENCIES BETWEEN RANDOM PROCESSES" filed Nov. 19, 2012, and assigned to the assignee hereof and hereby expressly incorporated by reference herein.

TECHNICAL FIELD

Certain aspects of the present disclosure generally relate to random processes and, more particularly, to a method and apparatus for inferring logical dependencies between random processes.

BACKGROUND

Humans can understand causality intuitively and apply their causal knowledge to everyday problems rather effortlessly. Computationally, causal inference can be a powerful tool for many practical applications. However, despite its long historical context, the process which causal inference is built upon has been relatively underdeveloped in the computational sense and is limited to philosophical discussion. In comparison to related topics in statistical learning, there is a deficiency in the understanding of how a causal model is built computationally. This gap needs to be closed as the accuracy and efficacy of causal inference is largely dependent on the causal model that it relies on. For example, it may be very straightforward to make inference about or diagnose a patient's symptoms given a causal model that defines the cause and effect relationship between diseases with symptoms, but almost always, such causal models so valuable for automatic patient diagnosis are handcrafted by human experts (e.g., doctors).

SUMMARY

Certain aspects of the present disclosure provide a method for inferring logical dependencies. The method generally includes identifying one or more nodes in a causal graph, wherein each node is connected to one or more other nodes with directional connections, and direction of a connection between a first node and a second node indicates a causal influence from the first node on the second node, and strength of connectivity of the connection between the first node and the second node indicates intensity of the causal influence, determining strength of connectivity of each connection in the causal graph using a temporal learning algorithm based on one or more binary time series inputs, wherein the temporal learning algorithm comprises a probabilistic model based on a Gradient descent algorithm, and inferring a first set of one or more nodes as causes of occurrence of the second node, wherein each node in the first set has a causal influence on the second node with strength of connectivity equal to or greater than a threshold.

Certain aspects of the present disclosure provide an apparatus for inferring logical dependencies. The apparatus generally includes means for identifying one or more nodes in a causal graph, wherein each node is connected to one or more other nodes with directional connections, and direction of a connection between a first node and a second node indicates a causal influence from the first node on the second node, and strength of connectivity of the connection between the first node and the second node indicates intensity of the causal influence, means for determining strength of connectivity of each connection in the causal graph using a temporal learning algorithm based on one or more binary time series inputs, wherein the temporal learning algorithm comprises a probabilistic model based on a Gradient descent algorithm, and means for inferring a first set of one or more nodes as causes of occurrence of the second node, wherein each node in the first set has a causal influence on the second node with strength of connectivity equal to or greater than a threshold.

Certain aspects provide a computer-program product for inferring logical dependencies, comprising a non-transitory computer-readable medium having instructions stored thereon, the instructions being executable by one or more processors. The instructions generally include instructions for identifying one or more nodes in a causal graph, wherein each node is connected to one or more other nodes with directional connections, and direction of a connection between a first node and a second node indicates a causal influence from the first node on the second node, and strength of connectivity of the connection between the first node and the second node indicates intensity of the causal influence, instructions for determining strength of connectivity of each connection in the causal graph using a temporal learning algorithm based on one or more binary time series inputs, wherein the temporal learning algorithm comprises a probabilistic model based on a Gradient descent algorithm, and instructions for inferring a first set of one or more nodes as causes of occurrence of the second node, wherein each node in the first set has a causal influence on the second node with strength of connectivity equal to or greater than a threshold.

Certain aspects of the present disclosure provide an apparatus for inferring logical dependencies. The apparatus generally includes at least one processor and a memory coupled to the at least one processor. The at least one processor configured to identify one or more nodes in a causal graph, wherein each node is connected to one or more other nodes with directional connections, and direction of a connection between a first node and a second node indicates a causal influence from the first node on the second node, and strength of connectivity of the connection between the first node and the second node indicates intensity of the causal influence, determine strength of connectivity of each connection in the causal graph using a temporal learning algorithm based on one or more binary time series inputs, wherein the temporal learning algorithm comprises a probabilistic model based on a Gradient descent algorithm, and infer a first set of one or more nodes as causes of occurrence of the second node, wherein each node in the first set has a causal influence on the second node with strength of connectivity equal to or greater than a threshold.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 6 illustrates an example table with original and estimated parameters for the network in FIG. 5A, in accordance with certain aspects of the present disclosure.

FIG. 7 illustrates an example table showing different combinations of necessary and sufficient causes, in accordance with certain aspects of the present disclosure.

DETAILED DESCRIPTION

Figure 1A:
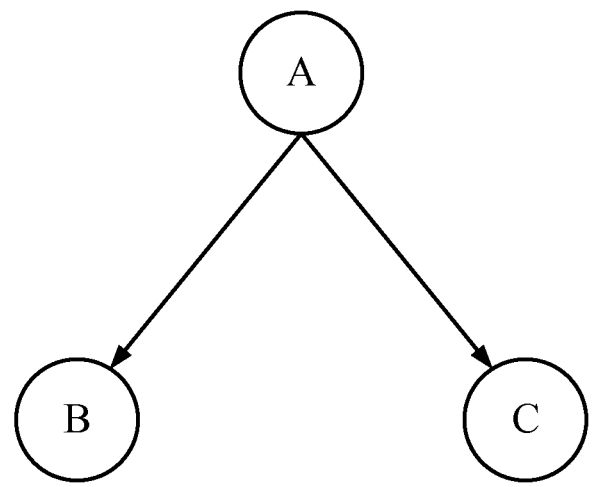
FIGS. 1A and 1B illustrate two example causal graphs, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Causal inference is a powerful tool for many practical applications. However, despite its long historical context, the process which causal inference is built upon is relatively underdeveloped computationally which is mostly limited to philosophical discussion. Accuracy and efficacy of causal inference is largely dependent on the causal model that it relies on. Certain aspects of the present disclosure present methods for modeling causal inference.

Causal understanding of events and objects are crucial in all scientific settings so it will come as no surprise that a lot of philosophic discourse has been collected on this subject. In an abstract and philosophic sense, causality can only be determined by counter-factual interventions. In other words, the causal element that connects two events X and Y (e.g., smoking and lung cancer) can only be determined if one could perform the following steps. Upon observing Y in the present (e.g., somebody is suffering from lung cancer), one may go back in time and change event X (e.g., prevent smoking). Everything else should remain unchanged. A new outcome Z is observed at the present time. If the new outcome Z is similar to Y, then X is not a cause for Y. If Z is different from Y, then X is considered to be a cause for Y. For example, if the patient did not smoke and he is still suffering from lung cancer, then smoking is not considered to be a cause for lung cancer. On the other hand, if the patient did not smoke in the past and he is no longer suffering from lung cancer at the counterfactual present, one may determine that smoking directly causes lung cancer. It should be noted that it would be a luxury to be able to conduct these perfectly controlled experiments in real life. In short, controlled intervention in the system is the best way to determine causal relations between things.

Inferring causality without intervention, purely based on observation may be possible depending on the definition of causality. Several approaches exist in the art for causal inference. The most relevant prior art is summarized here. For example, a causal inference method may use contingency data to output acyclic graphs. This method works best when the available data is in the form of a contingency table.

Granger causality (GC) performs causal inference with real-valued data that are expressed over time. Granger causality is determined by fitting a linear model between the input and output variables. The principle of causality that was first proposed by Norbert Wiener, but popularized by Clive Granger says that: Given two random processes X and Y, the random process X is considered causal to Y if the amount of uncertainty in predicting y(t) at time t given all of the past values of Y and X is less than that in predicting y(t) given only the past history of Y itself. Several extensions of the GC can be used to handle temporal data that takes on real values. In addition, a conditional GC approach may deal with problems involving multiple variables.

An information-theoretic generalization of Granger causality may use general temporal data and can handle general processes. However, this method is computationally complex and requires fitting models of high complexity. A very recent causal inference approach uses temporal logic and is based on a simple idea of what it means for a cause to create an effect. However, this approach does not yield strength of cause-effect relationships, and therefore does not have predictive ability.

Conventional Classification of Causes

A given cause can influence an effect in one of several ways, such as a sufficient cause, a necessary cause or a preventive cause. A cause is sufficient if the presence of an event C is sufficient to cause the event E. The sufficient cause may be captured in a logical relationship, as follows:

$$C \xrightarrow{SC} E$$

A cause is necessary if the presence of the event C is necessary for the effect E to occur. The necessary cause may be captured in a logical relationship, as follows:

$$\overline{C} \xrightarrow{NC} \overline{E}$$

A cause is preventive if the presence of the event C prevents the occurrence of the event E. The preventive cause may be captured in a logical relationship, as follows:

$$C \xrightarrow{PC} \overline{E}$$

The relationships in the above statements are the standard logical relationships. These relationships may also be formulated probabilistically. For example, the event C can cause the event E with a probability a (e.g., 0.6). Then, the event C may be called a sufficient cause with strength of a for the event E.

Certain aspects of the present disclosure propose a method for inferring logical dependencies (e.g., causal relationship) between random processes using a temporal learning algorithm. The temporal learning algorithm determines structure of a causal graph with a set of nodes. Input to the nodes may be binary time series (e.g., random processes). The output of the temporal learning algorithm may be a labeled directed graph in which the direction of the connection between two nodes (e.g., A and B) indicates causal direction and the strength of connectivity between the nodes indicates intensity of the causal influence. The temporal learning algorithm may iteratively update strength of connections between nodes to track variations in real time.

Temporal Causal Learning

Several challenges may be addressed in producing a causal graph. For example, if an event A causes both events B and C as shown in FIG. 1A, a pair-wise analysis between the nodes may wrongly result in a relationship between the events B and C (e.g., B causes C or vice-versa). This ambiguity should be avoided in modeling causality between events.

Figure 1B:
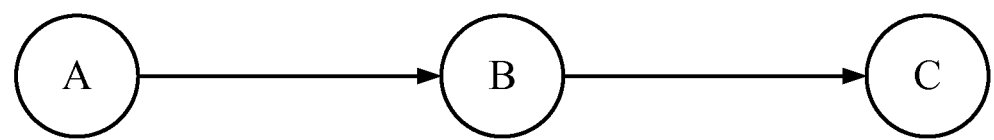

FIGS. 1A and 1B illustrate two example causal graphs, in accordance with certain aspects of the present disclosure. FIG. 1A illustrates a causal graph in which the event A causes both events B and C. FIG. 1B illustrates another causal graph in which the event A causes the event B, and the event B causes the event C. For the graph shown in FIG. 1B, upon considering only the events A and C, it is possible to wrongly conclude that there is an arrow between events A and C. In addition, a node may have spontaneous activity which is not due to any external variable in the system. This may cause the algorithm to infer wrong edges between other events (e.g., graph nodes) and the event A.

It should also be noted that connectivity of the graph may initially be unknown and is learned as evidence becomes available. This uncertainty can add tremendous computational complexity to the problem. In addition, when several causes have potential impact on one node, these causes may interact in a non-trivial manner.

In order to solve the causal inference problem, the following assumptions may be made in the temporal learning algorithm: i) An event can influence another event only in the future. ii) The influence of an event on the occurrence of other events occurs within a time scale, which is known a priori. iii) If multiple causes influence an effect, the causes interact in a pre-specified manner (e.g., OR, AND, or NOT relationship) to produce the effect.

For certain aspects, in order to infer causality, a network of cause-effect relationships may be used such that the edges are labeled according to the strength of causality. The incoming edges may influence the state of a node using a certain probabilistic model. The problem of causality inference may thus be reduced to a problem of reverse engineering the network parameters given the data (also called inference).

For certain aspects, probabilistic machinery may be used to deal with the inference problem, by writing out the Logarithmic Likelihood (called log-likelihood) and using a gradient descent algorithm to update the parameters in such a way that the log-likelihood of the data is increased. A set of all nodes that wield non-trivial influence on a given node in the reverse-engineered model may be inferred as causes of occurrence of the given node.

The proposed temporal learning algorithm has a low complexity, can be updated iteratively, can track changes in causality, may work with latent variables, and can infer causality for a general family of functions. A latent variable (as opposed to an observable variable), is a variable that is not directly observed but is rather inferred (through a mathematical model) from other variables that are observed (or directly measured). These advantages may give the proposed algorithm a significant advantage compared to the existing algorithms in the literature for causal learning.

Figure 2:
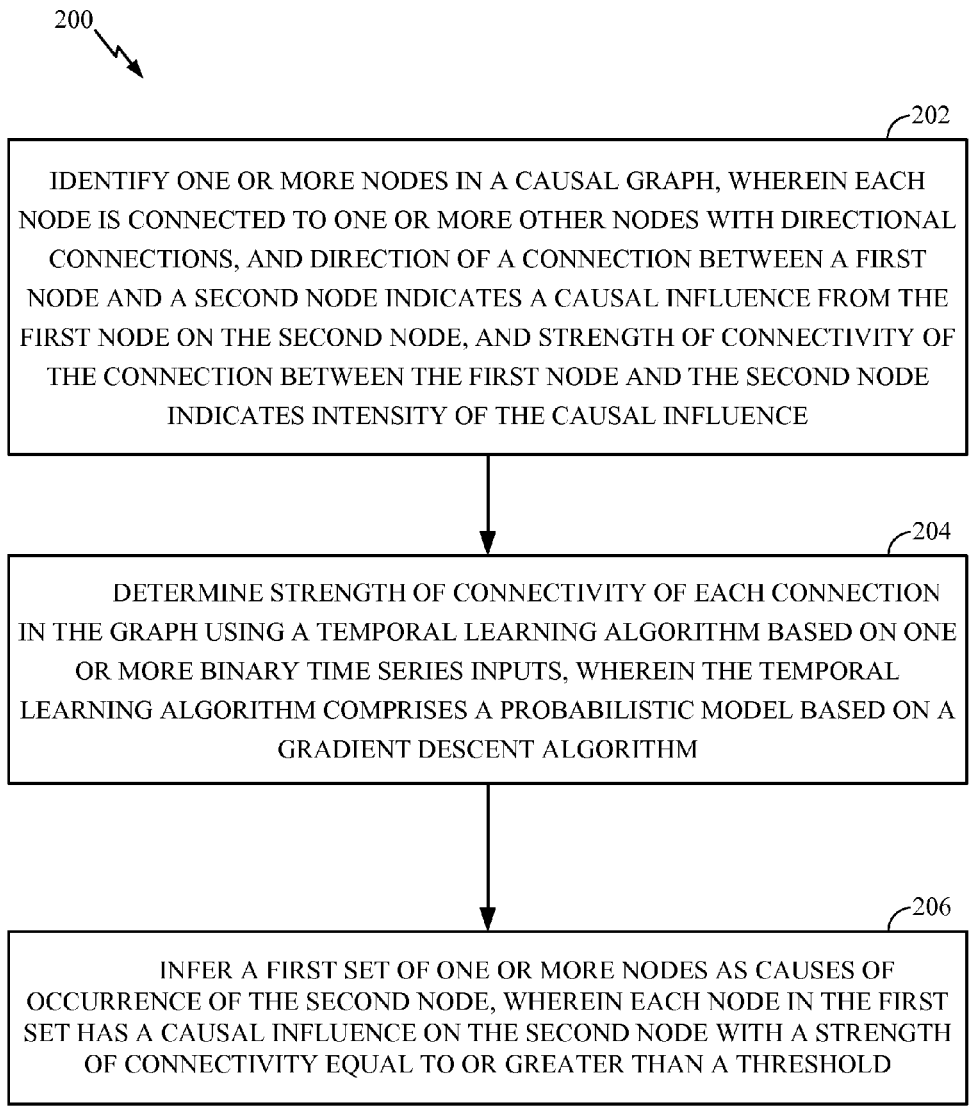
FIG. 2 illustrates example operations for inferring logical dependencies, in accordance with certain aspects of the present disclosure.

FIG. 2 illustrates example operations 200 for inferring logical dependencies, in accordance with certain aspects of the present disclosure. At 202, one or more nodes may be identified in a causal graph. Each node may be connected to one or more other nodes with directional connections. At 204, strength of connectivity of each connection in the graph may be determined using a temporal learning algorithm based on one or more binary time series inputs. Direction of a connection between a first node and a second node may indicate a causal influence from the first node on the second node, and strength of connectivity of the connection between the first node and the second node may indicate intensity of the causal influence. At 206, a first set of one or more nodes may be inferred as causes of occurrence of the second node. Each node in the first set may have a causal influence on the second node with strength of connectivity equal to or greater than a threshold.

Modeling the Causal Inference

First, a single effect $E=C_{n+1}$ may be considered. Multiple potential causes C, may affect the effect E. Each cause may not only influence the effect in the immediate time instant following the event, but it can also influence the effect in a time window after occurrence of the cause. This characteristic may be captured explicitly by an exponential decay function.

A process $A_i(t)$, i=1, ..., n may be defined as follows:

$A_i(t)=1$ if $C_i$ occurred at time $t$, for all $i$, for all $t$.

From the process $A_i(t)$ a process $f_i(t)$ may be obtained which incorporates the persistence of the process $C_i$ in producing the output at time t (e.g., temporal persistence). One way of obtaining $f_i(t)$ from $A_i(t)$ may be prolonging every effect for a certain amount of time with certain intensity. As an example, the temporal persistence may be modeled using a standard function $g(.)$ that is convolved with $A_i(t)$. An example of $g(t)$ may be an exponential decay function with time constant $\tau$ as shown in FIG. 3.

$$g_i(t) = \exp\left(-\frac{t}{\tau}\right); t \geq 0$$

Figure 3:
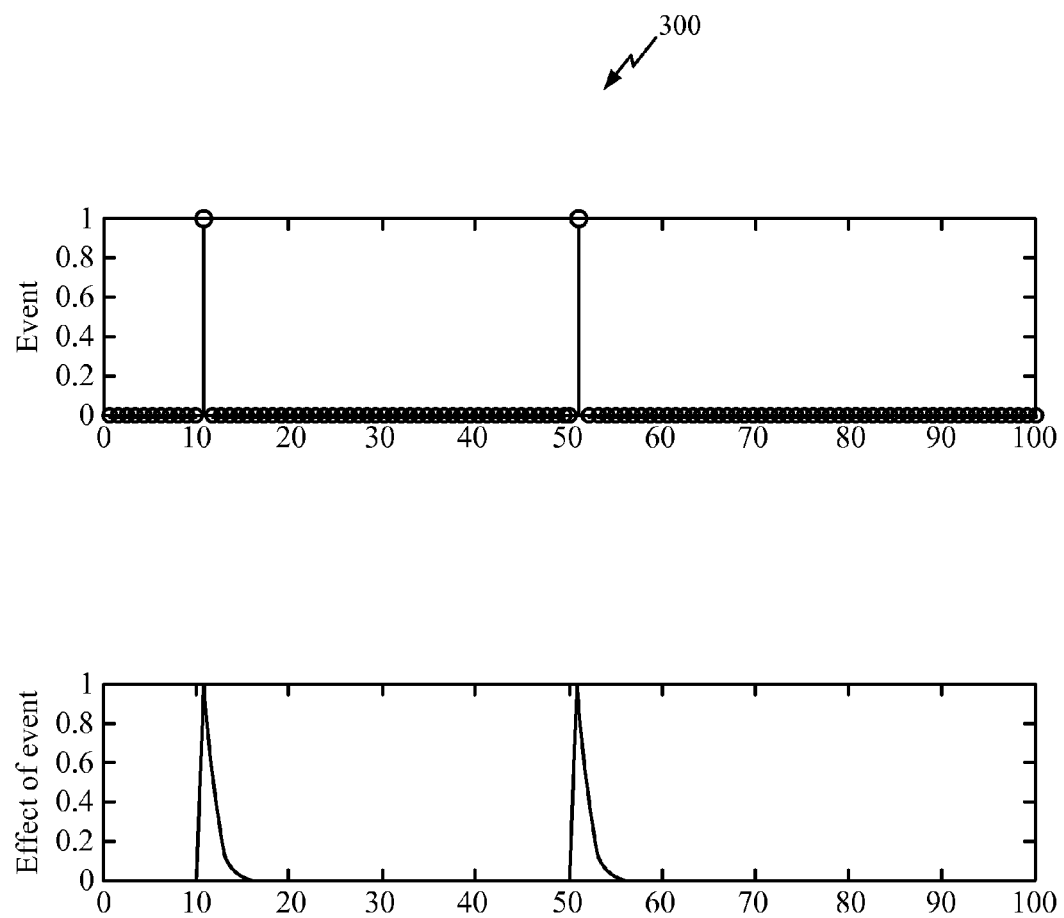
FIG. 3 illustrates an example effect of an event, in accordance with certain aspects of the present disclosure.

FIG. 3 illustrates an example effect of an event, in accordance with certain aspects of the present disclosure. As illustrated, when the event occurs, it can affect other events for a certain time as shown with an exponential decay function. Effect of the event may decrease exponentially as time passes.

In general, among multiple potential causes for an effect E, some of the causes are true causes. A true cause should be able to produce the effect, irrespective of the absence or presence of other causes. For certain aspects, a true cause may be modeled as follows:

$$E(t) = \beta_1 A_1(t) | \beta_2 A_2(t)$$

where $\beta_i \in \{0,1\}$. If $\beta_i = 1$, $A_i$ has an impact on E. Otherwise, $A_i$ does not have an impact on E.

To model the fact that $A_i$ may not always cause E, noise may be added to the system, which results in a noisy OR model, as follows:

$$E(t) = R(\beta_1 A_1(t)) | R(\beta_2 A_2(t))$$

where $\beta_i$ is the probability that $A_i$ influences E and $R(p)$ indicates a spiking function that produces a spike with probability p at the time it happens. The temporal persistence may be included into the model by convolving $A_i(t)$ with $g(t)$, as follows:

$$E(t) = R(\beta_1 f_1(t)) | R(\beta_2 f_2(t)),$$

$$f_i(t) = g(t) * A_i(t)$$

where $g(t)$ can be an exponential decay function, and * represents a convolve operation.

In the above model, in the absence of any of the causes, the effect cannot occur. Since all the possible causes are not modeled, there may still be a chance that the effect can occur in the absence of any of the known or modeled causes. This can be modeled by including a spontaneous occurrence probability $R(\gamma)$ in the model, as follows:

$$E(t) = R(\beta_1 f_1(t)) | R(\beta_2 f_2(t)) | R(\gamma)$$

The spontaneous occurrence probability $R(\gamma)$ may be treated as unknown. As an example, the spontaneous occurrence probability may be modeled as a third cause with $f_3 = 1$, and $\beta_3 = \gamma$, as follows:

$$E(t) = R(\beta_1 f_1(t)) | R(\beta_2 f_2(t)) | R(\beta_3 f_3(t))$$

The problem of causal modeling is now reduced to the following problem: Given the processes $A_i(t)$, what are the values of $\beta_i$, $i=1, \ldots, 3$.

Solution

In order to find parameters of the causal model, certain aspects may assume initial values for $\beta_i$ all i (e.g., one possible starting value is zero). For certain aspects, instead of encoding $\beta_i$ in the algorithm, another parameter $b_i$ may be calculated. The relationship between $\beta_i$ and $b_i$ may be defined as follows:

$$\beta_i = \frac{\exp(b_i)}{1 + \exp(b_i)}$$

where $\exp(.)$ represents exponential function. Mapping between $\beta_i$ and $b_i$ ensures that when $b_i$ ranges from $-\infty$ to $+\infty$, $\beta_i$ will range from 0 to 1. Therefore, the algorithm can operate without any constraint on $b_i$. At any time t, $$\text{If } E(t) = 1, b_i \leftarrow b_i + \Delta \frac{(1-\beta_{\backslash i}) f_i(t)}{\beta_T} \beta_i (1-\beta_i)^2$$

$$\text{If } E(t) = 0, b_i \leftarrow b_i + \Delta \frac{f_i(t)}{1 - \beta_i f_i(t)} \beta_i (1-\beta_i)^2$$

The right hand side of the above equations may be evaluated using the estimates of $\beta_i$ from a previous step, which are obtained using the previous estimate of $b_i$. $\Delta$ may represent a learning parameter, which can be adjusted prior to learning. $\beta_T$ may represent the total effect of sufficient causes on E, and $\beta_{\backslash i}$ may represent a probability that the event $E_i$ happens due to reasons other than $A_i$. $\beta_T$ and $\beta_{\backslash i}$ may be defined as follows:

$$\beta_T = \beta_1 f_1(t) | \beta_2 f_2(t) | \ldots | \beta_n f_n(t)$$

$$\beta_{\backslash i} = \beta_1 f_1(t) | \beta_2 f_2(t) | \ldots | \beta_{i-1} f_{i-1}(t) | \beta_{i+1} f_{i+1}(t) | \ldots | \beta_n f_n(t)$$

Simulation

Figure 4A:
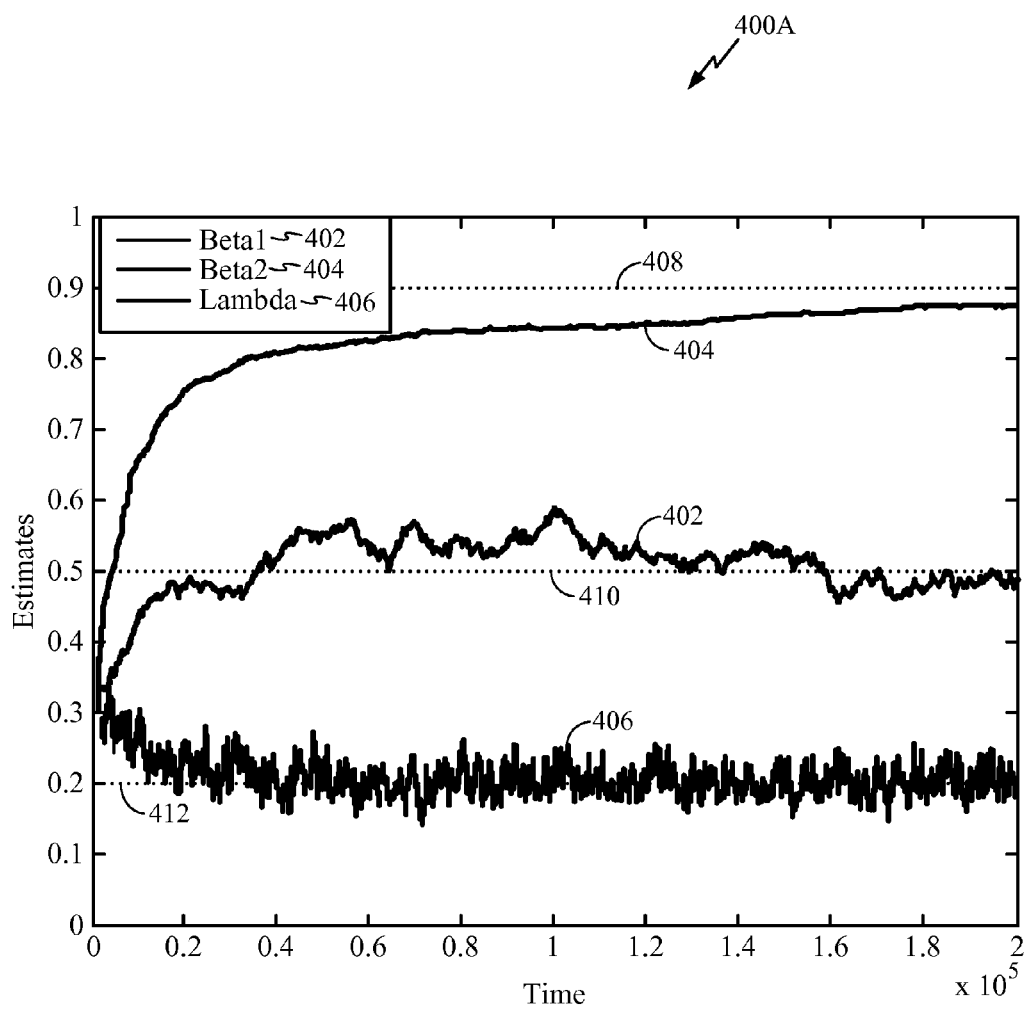
FIGS. 4A-4C illustrate example simulation results with two potential causes influencing an effect with different initial values, in accordance with certain aspects of the present disclosure.
Figure 4B:
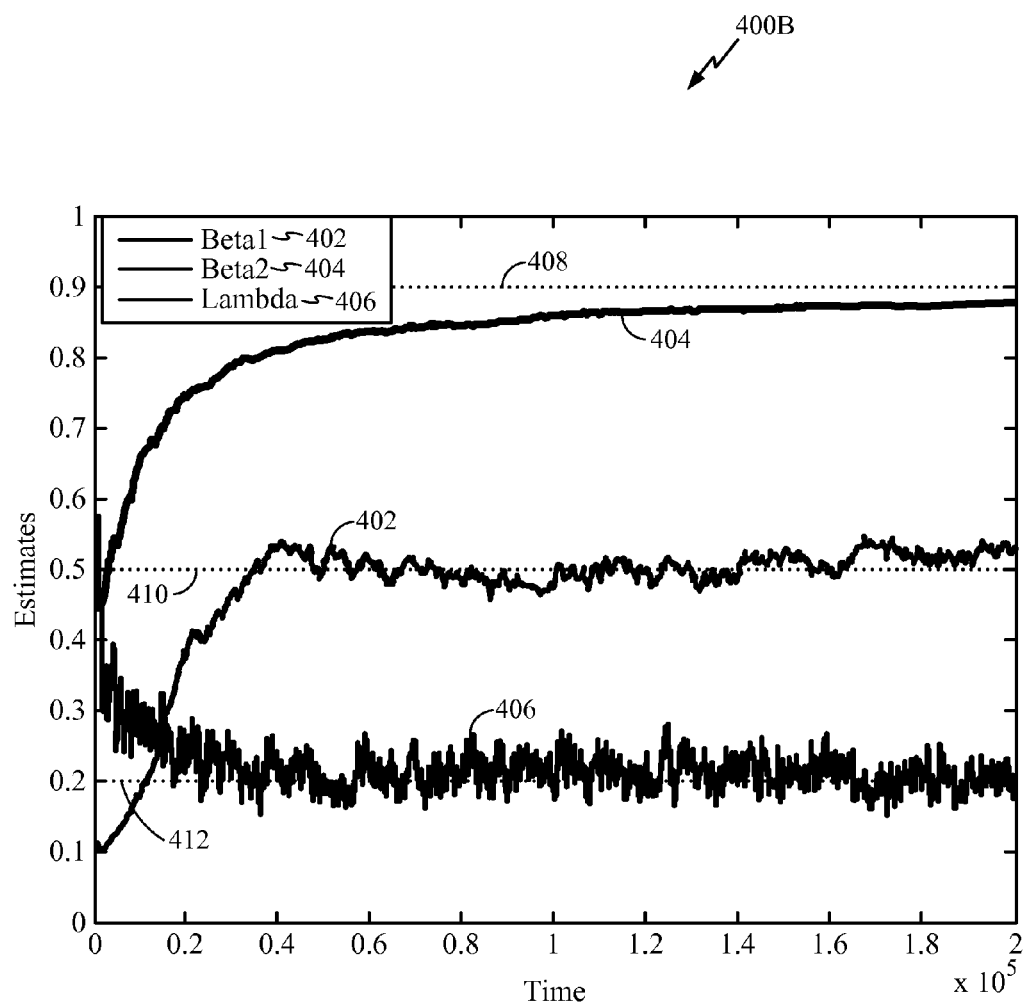
Figure 4C:
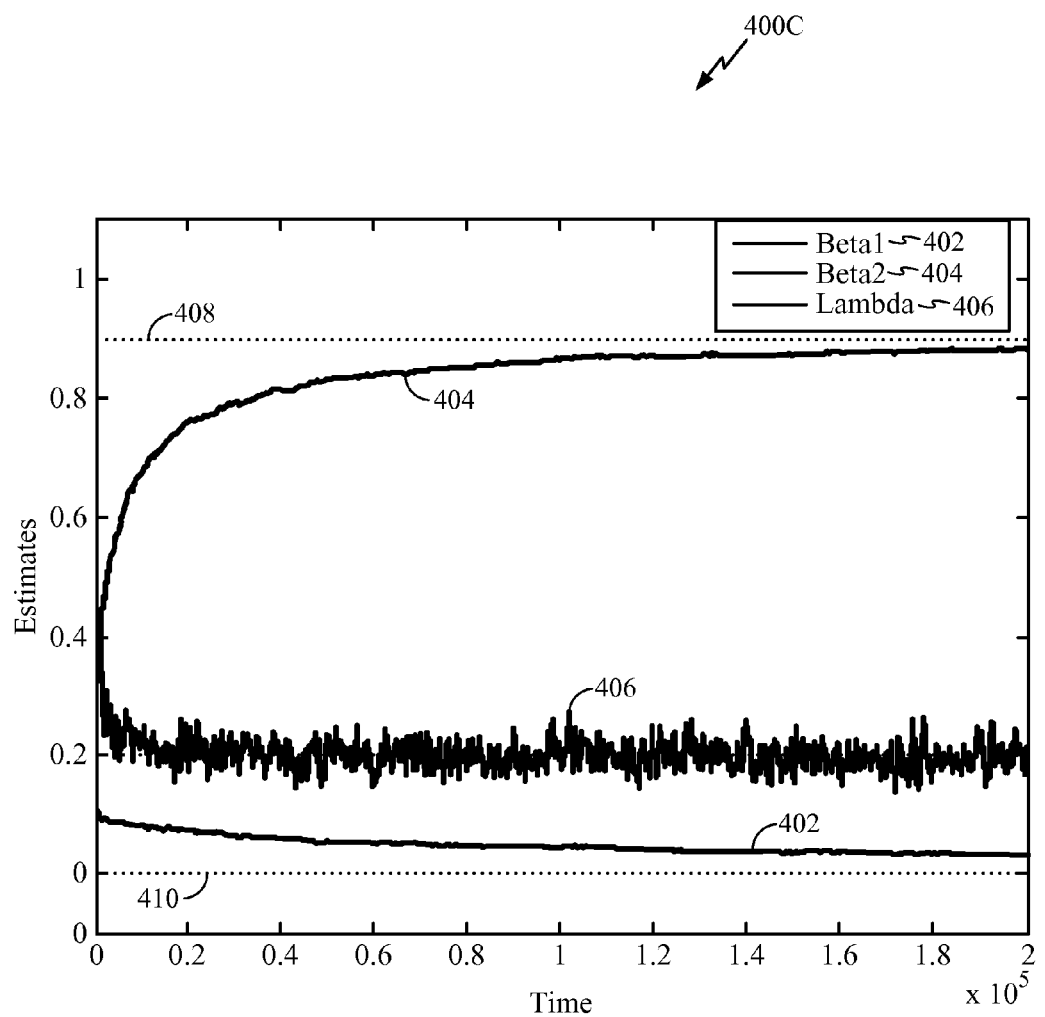

An example causal learning problem with two potential causes influencing the effect E is considered. FIGS. 4A-4C illustrate example simulation results 400A, 400B and 400C with different initial values. As shown in FIG. 4A, the solid curves 402, 404 and 406 show the learnt value of the parameters $\beta_1$, $\beta_2$ and $\lambda$, and the dotted curves 410, 408 and 412 show the actual values of these parameters, respectively. It can be seen that the estimated values converge to the actual values. Another example with different (random) initial condition is shown in FIG. 4B. It can be seen that in both FIGS. 4A and 4B, the estimated values converge to the actual values with different initial values for $\beta_1$, $\beta_2$ and $\lambda$. The FIG. 4C shows an example where the value of $\beta_1$ is set to zero.

Sparsity in the Algorithm:

In several situations, the algorithm may need to return as few non-zero elements as possible. This can be modeled by setting up the maximum likelihood problem with a penalty for sparsity. For example, the sparsity constraint may be modeled as follows:

$$\text{Max } P(\text{data}/\beta) - \mu|\beta|_0$$

where Max $P(\text{data}/\beta)$ represents the maximum likelihood of the data given the parameter $\beta$, and $|.|_0$ shows the $L_0$ norm. The term $|\beta|_0$ captures the number of non-zero $\beta_i$s, and $\mu$ is a constant for the penalty. For certain aspects, the $L_0$ norm in the above equation may be relaxed and be replaced with the $L_1$ norm, as shown in the following equation.

$$\text{Max } P(\text{data}/\beta) - \mu|\beta|_1$$

By writing out the maximum likelihood equations for the temporal learning problem, a modified gradient descent algorithm may be obtained, as follows:

$$\text{If } E(t) = 1, b_i \leftarrow b_i + \Delta \left[ \frac{(1-O_i) f_i(t)}{d} - \mu \right] \beta_i (1-\beta_i)^2$$

$$\text{If } E(t) = 0, b_i \leftarrow b_i - \Delta \left[ \frac{f_i(t)}{1-\beta_i f_i(t)} - \mu \right] \beta_i (1-\beta_i)^2$$

For certain aspects, parameters in the above equations may be updated at every time step, or they may be updated once every few time steps (e.g., once in a block of time T). The convergence time may be shorter if parameters are updated once in a block of time T. In addition, updating the parameters is costly in terms of hardware implementation. Therefore, the value of the parameters may only be updated once in a block of time T to reduce complexity/cost. The update that is applied after time T may be equal to the sum of the updates generated at every time step by the algorithm, scaled reasonably as preferred.

Learning Causality Graphs in a Network of Cause-Effect Relationships

A set of n random processes that interact with each other may be considered. A network (as illustrated in FIG. 5) with certain structure of causal influence may be assumed in which the evolution of node i can depend only on nodes in C(i). Each process A may be generated according to the following rule:

$$A_i(t)=R(\beta_{j_1}f_{j_1}(t))|R(\beta_{j_2}f_{j_2}(t))| \ldots |R(\beta_{j_k}f_{j_k}(t))$$

where $C(i)=\{j_1, j_2, \ldots, j_k\}$

Figures 5A, 5B:
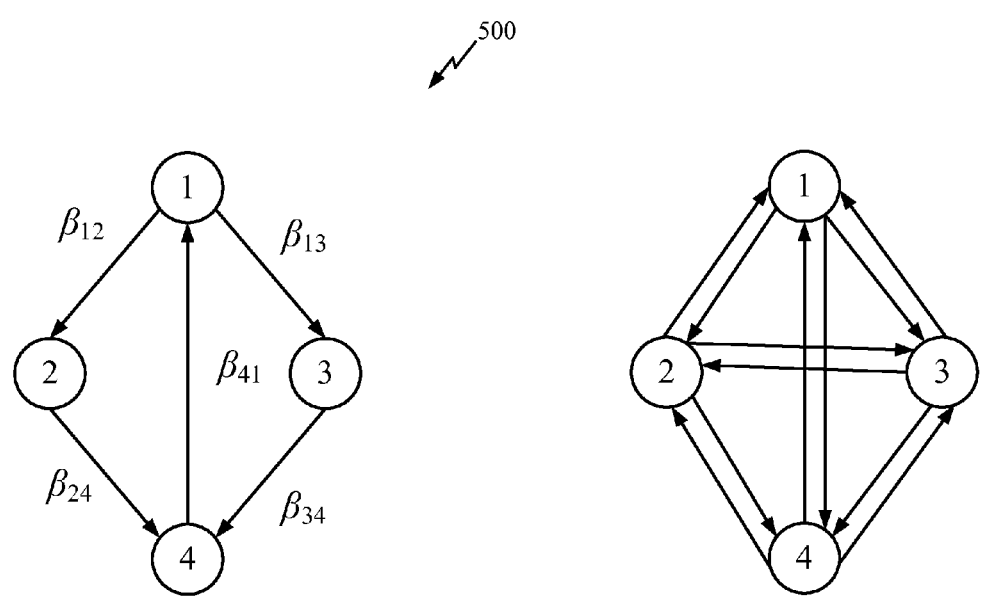
FIGS. 5A and 5B illustrate example networks of cause-effect relationship, in accordance with certain aspects of the present disclosure.

FIGS. 5A and 5B illustrate example networks 500 of cause-effect relationships, in accordance with certain aspects of the present disclosure. Structure of the network and its parameters may be inferred using the causal learning algorithm. In each iteration of the algorithm, structure of the network and its parameters may be estimated using the models described above. At first, it may be assumed that the network is a fully connected graph as shown in FIG. 5B.

At each node j, strength of each connection between node j and other nodes (e.g., $\beta_{1j}, \beta_{2j}, \ldots, \beta_{nj}$) may be estimated. The causal learning algorithm may be highly distributed and at the end of the algorithm, all of the $n^2$ parameters of the network can be estimated. If the estimated value of a parameter is less than or equal to a threshold, the parameter can be considered to be equal to zero. Therefore, a connection having strength of connectivity equal to zero (or smaller than the threshold) may be deleted. An example graph that is output of the causal learning algorithm is shown in FIG. 5A. In this graph only nonzero connections between nodes are shown.

FIG. 6 illustrates an example table with original and estimated (inferred) values for the network in FIG. 5A, in accordance with certain aspects of the present disclosure. It can be seen that the values that are inferred using the temporal learning algorithm are very close to the original (actual) values of the network, with less than 10% error.

The temporal noisy OR model as described above is an instance of sufficient causation. The causal learning algorithm may be generalized to cover other types of causes such as necessary and preventive causation.

Preventive Causation

A preventive cause can effectively ensure that the outcome does not take place. The preventive cause may be modeled by the following logic: $C \Rightarrow \overline{E}$. Similar to the in the temporal noisy OR case, the event C can prevent the event E with a certain strength $\gamma$.

The mathematical model for multiple preventive causes may be written as follows:

$$E(t)=R(\lambda)R(1-\gamma_1 f_1(t))R(1-\gamma_2 f_2(t))$$

in which if $\gamma_1=1$, $f_1 \Rightarrow \overline{E}$. Also, if $\gamma_1=0$, there may not be any correlation between $f_1$ and E. Spontaneous excitation $\lambda$ is also captured in the above formula. It should be noted that a non-temporal version of this problem is called the Noisy-And-Not in the literature.

Learning Rule for Preventive Causation:

The stochastic gradient descent on maximum likelihood estimate for the Noisy And Not may be derived. As described above, instead of encoding $\gamma_i$ in the algorithm, $g_i$ may be encoded. The relationship between $\gamma_i$ and $g_i$ may be written as follows:

$$\gamma_i = \frac{\exp(g_i)}{1+\exp(g_i)}$$

This remapping ensures that as $g_i$ ranges from $-\infty$ to $+\infty$, $\gamma_i$ will range from 0 to 1, thus the algorithm can operate without any constraint on $g_i$. The parameter μ is used to adjust the sparsity of the solution. Increasing μ tends to increase the sparsity of the solution. At any time t, $$\text{If } E(t)=1, g_i \leftarrow g_i - \Delta\left[\frac{f_i(t)}{1-\gamma_i f_i(t)} - \mu\right]\gamma_i(1-\gamma_i)^2$$

$$\text{If } E(t)=0, g_i \leftarrow g_i + \Delta\left[\frac{\lambda(1-\gamma_{\setminus i})f_i(t)}{\gamma_T} - \mu\right]\gamma_i(1-\gamma_i)^2$$

The right hand side of the above equations may be evaluated using the estimates of $\gamma_i$ in the previous step, which are obtained using the previous estimate of $g_i$. $\Delta$ is a learning parameter, which can be adjusted prior to learning, $\gamma_T$ is the total preventive effect on E and $\gamma_{\setminus i}$ is the total preventive effect on E other than node i, as follows:

$$1-\gamma_T = \Pi_j(1-\gamma_j f_j(t))$$

$$1-\gamma_{\setminus i} = \Pi_{j \neq i}(1-\gamma_j f_j(t))$$

Necessary Causation

A cause is said to be a necessary cause, if absence of the cause implies absence of the effect. In other words, the cause is perceived to be necessary to create the effect if $\overline{C} \Rightarrow \overline{E}$. A necessary cause may operate on a process with strength $\alpha$ (e.g., $$\overline{C} \xrightarrow{\alpha} \overline{E}).$$

The mathematical model for multiple necessary causes may be written as follows:

$$E(t)=R(\lambda)R(1-\alpha_1 \bar{f}_1(t))R(1-\alpha_2 \bar{f}_2(t))$$

in which, if $\alpha_1=1$. In addition, if $\alpha_1=0$, there is no correlation between $f_1$ and E. the parameter $\lambda$ models the spontaneous excitation. It should be noted that a non-temporal version of the above equation is called the Noisy-And in the literature.

Learning Rule for Necessary Causation:

The stochastic gradient descent on maximum likelihood estimate for the Noisy And model may be derived. Similar to other cases, instead of encoding $\alpha_i$ in the algorithm, $\alpha_i$ may be encoded. The relationship between $\alpha_i$ and $\alpha_i$ may be written as follows:

$$\alpha_i = \frac{\exp(a_i)}{1+\exp(a_i)}$$

The remapping ensures that as $a_i$ ranges from $-\infty$ to $+\infty$, $\alpha_i$ will range from 0 to 1, thus the algorithm can operate without any constraints on $a_i$. The parameter μ is used to adjust the sparsity of the solution. Increasing μ tends to increase the sparsity of the solution.

At any time t, $$\text{If } E(t)=1, a_i \leftarrow a_i - \Delta\left[\frac{\bar{f}_i(t)}{1-\alpha_i f_i(t)} - \mu\right]\alpha_i(1-\alpha_i)^2$$

$$\text{If } E(t)=0, a_i \leftarrow a_i - \Delta\left[\frac{\lambda(1-\alpha_{\setminus i})\bar{f}_i(t)}{\alpha_T} - \mu\right]\alpha_i(1-\alpha_i)^2$$

The right hand side is evaluated using the estimates of $\alpha_i$ in the previous step, which are obtained using the previous estimates of $a_i$. $\Delta$ may represent a learning parameter, which can be adjusted prior to learning. $\alpha_T$ may represent the total effect of necessary causes, and $\alpha_{\setminus i}$ may represent the total effect of necessary causes on the event E in the absence of $\alpha_i$, as follows:

$$1-\alpha_T=\Pi_j(1-\alpha_j \bar{f}_j(t))$$

$$1-\alpha_{\setminus i}=\Pi_{j\neq i}(1-\alpha_j \bar{f}_j(t))$$

Combinations of Various Types of Causation:

In general, a model may include a mixture of necessary and sufficient causes. For example, a necessary cause $C_1$ and a sufficient cause $C_2$ may jointly influence an effect. Such a relationship may cause conflict. For example, when the necessary cause is absent and the sufficient cause is present (e.g., $C_1=0$, and $C_2=1$), the output is indeterminate. To break the conflict, a priority may be set for the causes in case of a conflict. Thus, an OR logic table is consistent when sufficient causation is given priority, and an AND logic table is consistent when necessary causation is given priority.

FIG. 7 illustrates an example table showing example combinations of necessary and sufficient causes, in accordance with certain aspects of the present disclosure. As illustrated in the table, for the case that a necessary cause $C_1$ is equal to zero and a sufficient cause $C_2$ is equal to one, if the necessary cause is given priority, the effect E would be equal to zero. If the sufficient cause is given priority, the effect E would be equal to one.

The inference algorithms may have two different types of outputs depending on which cause is given priority. The output for the case when the necessary cause is given preference may differ from the output for the case when sufficient cause is given preference. In both of these cases, a preventive cause (if any) may be given foremost preference.

The type of each edge between nodes may be unknown a priori. This may be captured in the model by replacing each edge with three possible edges, one for each type of causation. Thus for any edge i, the variables $\alpha_i$, $\beta_i$ and $\gamma_i$ may be estimated for the necessary, sufficient and preventive causation, respectively. The following general model may be used to estimate all the parameters:

$$E(t)=[R(\beta_1 f_1(t))|\ldots|R(\beta_n f_n(t))]R(1-\alpha_1 \bar{f}_1(t))\ldots R(1-\alpha_n \bar{f}_n(t))R(1-\gamma_1 f_1(t))\ldots R(1-\gamma_n f_n(t))$$

Figure 8:
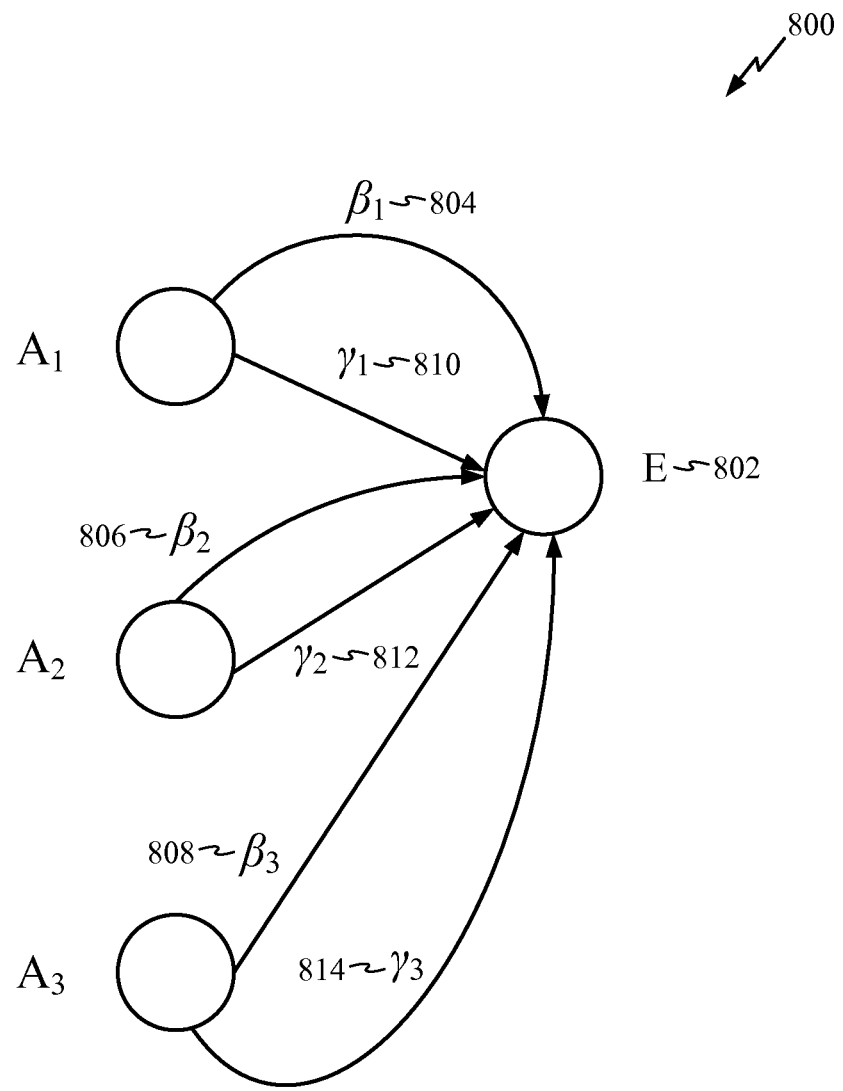
FIG. 8 illustrates an example network with sufficient or necessary causes, in accordance with certain aspects of the present disclosure.

FIG. 8 illustrates an example network with sufficient and necessary causes, in accordance with certain aspects of the present disclosure. For the effect E 802, each cause may be either sufficient (e.g., 804, 806, 808) or necessary (e.g., 810, 812, 814).

Inference Algorithm

For certain aspects, when the causal learning algorithm is performed on the above model, the variables corresponding to each type of causation may be compared to a threshold. If none of the three variables $\alpha_i$, $\beta_i$ and $\gamma_i$ crosses the threshold (e.g., is higher than the threshold), i may not be a cause for the event E. If only one of the variables $\alpha_i$, $\beta_i$, and $\gamma_i$ crosses the threshold, then i may be declared as a cause of the corresponding type for the event E. If more than one of these variables crosses the threshold, the largest variable may be declared as the type of the cause. Here again $a_i$, $b_i$ and $g_i$ are used in the iterative update instead of $\alpha_i$, $\beta_i$ and $\gamma_i$.

If $E(t)=1$, $$a_i \leftarrow a_i - \Delta\left[\frac{\bar{f}_i(t)}{1-\alpha_i f_i(t)} - \mu\right]\alpha_i(1-\alpha_i)^2$$

-continued $$b_i \leftarrow b_i + \Delta\frac{(1-\beta_{\setminus i})f_i(t)}{\beta_T}\beta_i(1-\beta_i)^2$$

$$g_i \leftarrow g_i - \Delta\left[\frac{f_i(t)}{1-\gamma_i f_i(t)} - \mu\right]\gamma_i(1-\gamma_i)^2$$

If $E(t)=0$, $$a_i \leftarrow a_i + \Delta\left[\frac{(1-\alpha_{\setminus i})\beta_T(1-\gamma_T)\bar{f}_i(t)}{1-p} - \mu\right]\alpha_i(1-\alpha_i)^2$$

$$b_i \leftarrow b_i - \Delta\frac{(1-\alpha_T)(1-\beta_{\setminus i})(1-\gamma_T)f_i(t)}{1-p}\beta_i(1-\beta_i)^2$$

$$g_i \leftarrow g_i + \Delta\left[\frac{(1-\alpha_T)\beta_T(1-\gamma_{\setminus i})f_i(t)}{1-p} - \mu\right]\gamma_i(1-\gamma_i)^2$$

The right hand sides of the above equations may be evaluated using the previous estimates of $a_i$, $b_i$ and $g_i$, from which the estimates of $\alpha_i$, $\beta_i$ and $\gamma_i$ are obtained. The various quantities used in the updates may be defined, as follows:

$$1-\alpha_T=\Pi_j(1-\alpha_j \bar{f}_j(t))$$

$$1-\alpha_{\setminus i}=\Pi_{j\neq i}(1-\alpha_j \bar{f}_j(t))$$

$$\beta_T=\beta_1 f_1(t)|\beta_2 f_2(t)|\ldots|\beta_n f_n(t)$$

$$\beta_{\setminus i}=\beta_1 f_1(t)|\beta_2 f_2(t)|\ldots|\beta_{i-1}f_{i-1}(t)|\beta_{i+1}f_{i+1}(t)|\ldots|\beta_n f_n(t)$$

$$1-\gamma_T=\Pi_j(1-\gamma_j f_j(t))$$

$$1-\gamma_{\setminus i}=\Pi_{j\neq i}(1-\gamma_j f_j(t))$$

$$p=(1-\alpha_T)\beta_T(1-\gamma_T)$$

For certain aspects, the right hand side of the update of a certain type of causation may be forced to include no knowledge of the other types of causation from the same edge. For example, the update rule of $a_i$ may not depend on the values of $b_i$ and $g_i$. This type of knowledge constraint can be enforced on all or some of the causes in the network that includes varying combinations of different types of causes.

Figure 9:
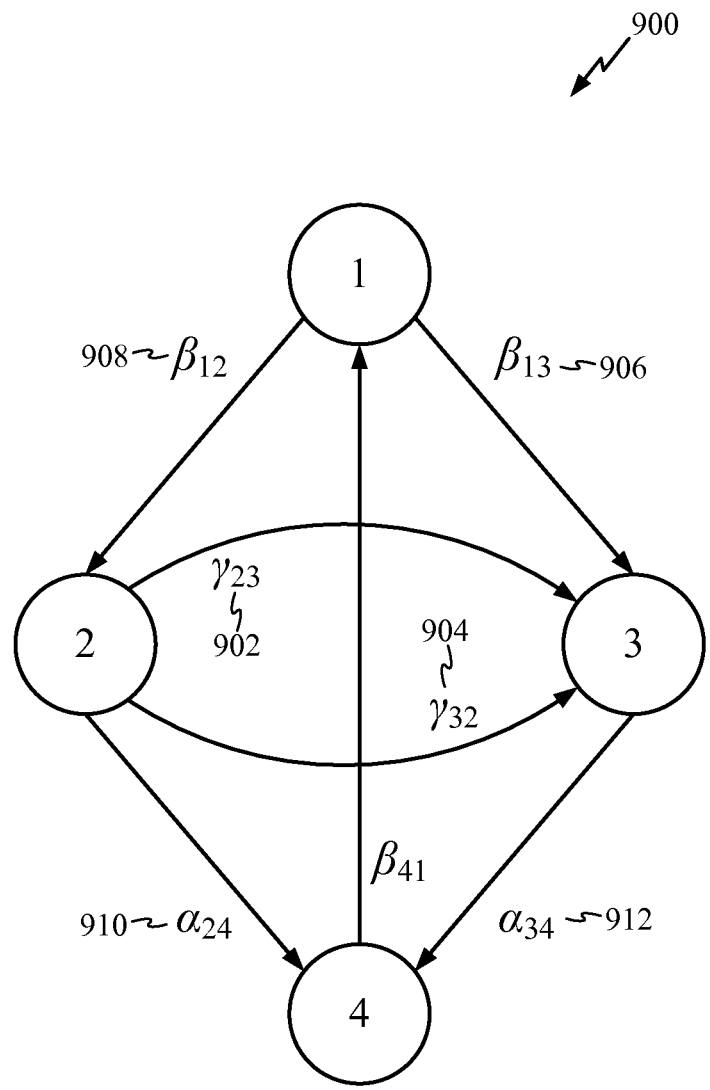
FIG. 9 illustrates an example network with sufficient, necessary or preventive causes, in accordance with certain aspects of the present disclosure.

FIG. 9 illustrates an example network with sufficient, necessary or preventive causes, in accordance with certain aspects of the present disclosure. In the network, arrows 902 and 904 denote preventive causes, arrows 906 and 908 denote sufficient causes, and arrows 910 and 912 denote necessary causes. The goal is to recover this network given the data. Simulation results show that the proposed temporal learning algorithm is able to recover all the parameters within 10% error.

Figure 11:
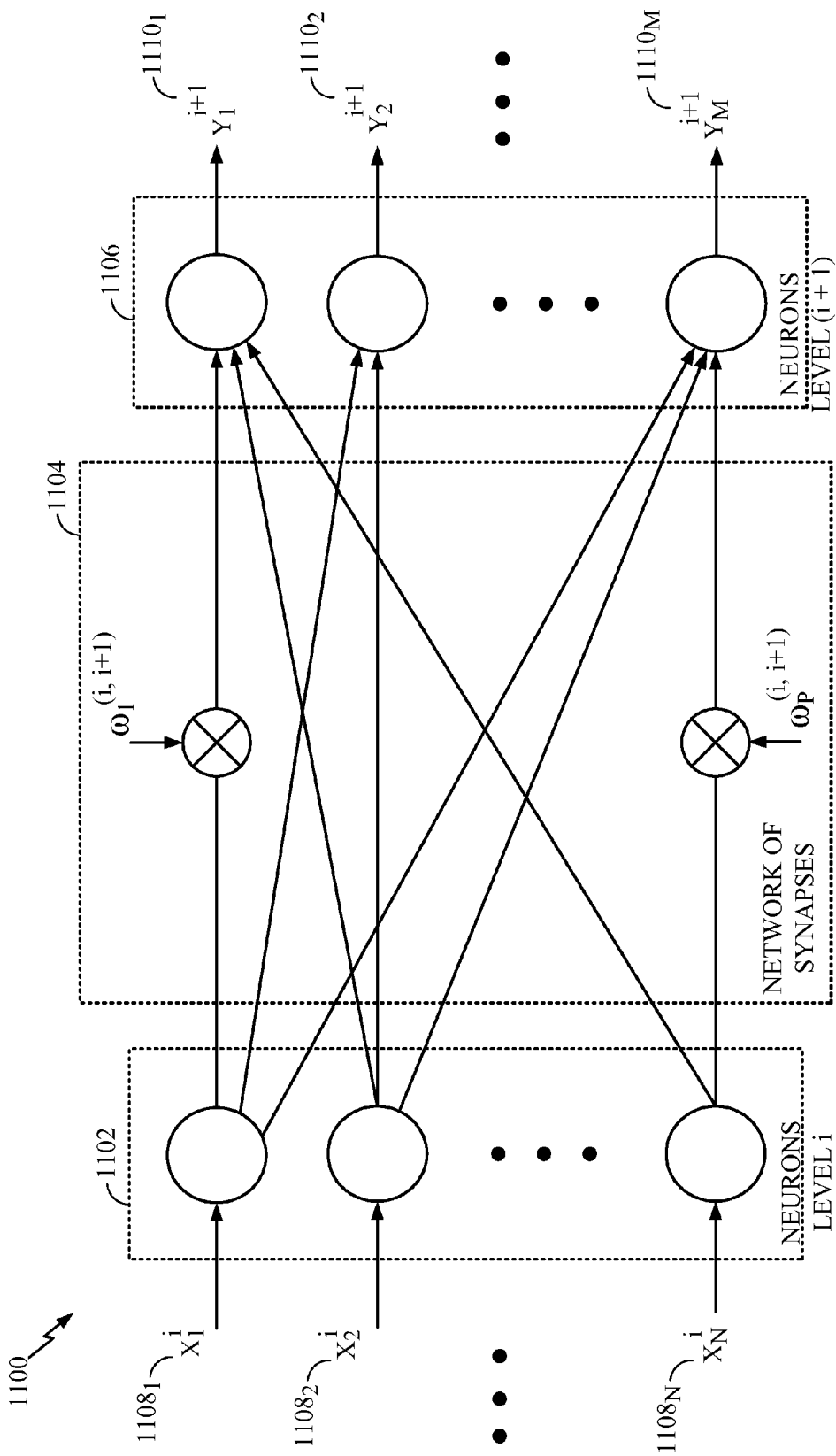
FIG. 11 illustrates an example neural network in accordance with certain aspects of the present disclosure.

Causal Inference Based on Neural Networks:

A standard artificial neural network (as shown in FIG. 11) may be considered where the state of each node is determined by the state of its incoming edges, this can be modeled as follows:

$$A_i(t+1) = \psi_t\left(\sum_j w_{ij}A_j(t) - \tau_i\right)$$

where $A_i(t+1)$ denotes the state of node i (e.g., state of the neuron i). $\psi_t$ may represent a threshold function, as follows:

$$\psi_t(x)=1; x>0$$

$$\psi_t(x)=0; x\leq 0$$

It can be assumed that $w_{ij}=0$ for all edges other than the incoming edges. The variable $\tau_i$ may act as a threshold. Alternately, a node 0 may be created for which activity is ever-present input with $w_{0j}=-\tau_i$ and $A_0(t)=1$, which may result in more consistent notation, as follows:

$$A_i(t+1) = \psi_t\left(\sum_j w_{ij} A_j(t)\right)$$

The output at a given time in the above model may only depend on the inputs (causes consistent with our viewpoint) at any given time. With the persistence of A using f, the above model may be modified to include persistent of an input, as follows:

$$A_i(t+1) = \psi_t\left(\sum_j w_{ij} f_j(t)\right)$$

The above model may have two issues. First issue is how to model noise in the system. The second issue is that since $\psi_t$ is a discontinuous function, it is not possible to derive gradient descent algorithms that can infer the values of $w_{ij}$.

For certain aspects, a probabilistic model may be used to overcome the above issues, as follows,:

$$A_i(t+1) = R\left\{\psi\left(\sum_j w_{ij} A_j(t)\right)\right\}$$

where $\psi$ is a continuous function approximating the threshold function $\psi_t$. For certain aspects, the function $\psi$ can be implemented as a sigmoid function $\psi(x)$, as follows:

$$\psi(x) = \frac{1}{1+e^{-x}}$$

Figure 10:
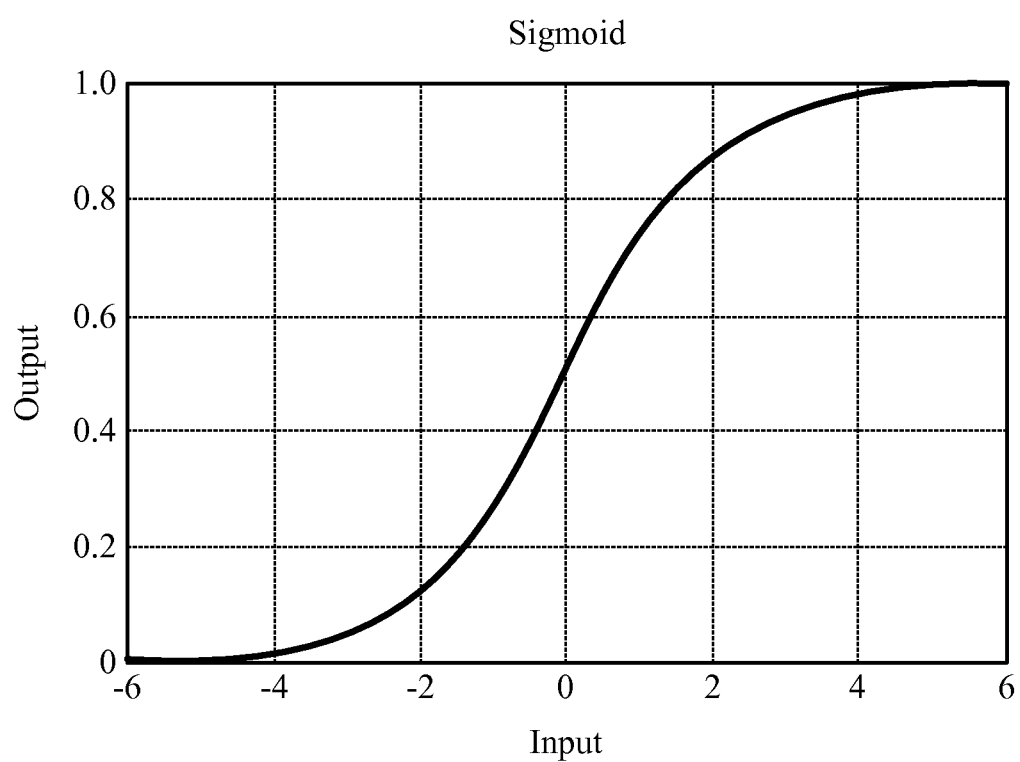
FIG. 10 illustrates an example sigmoid function, in accordance with certain aspects of the present disclosure.

FIG. 10 illustrates an example sigmoid function, in accordance with certain aspects of the present disclosure. The sigmoid function has the following property:

$$\frac{\psi'(x)}{\psi(x)} = 1 - \psi(x)$$

Learning Rule

The learning rule for the causal inference based on neural networks may be written as follows: For each j, $$\text{If } A_j(t)=1, w_{ij} \leftarrow w_{ij} + \Delta\left[\frac{\psi'\left(\sum_j w_{ij}f_j(t)\right)}{\psi\left(\sum_j w_{ij}f_j(t)\right)}\right] f_i(t) - \text{sign}(w_{ij})\mu$$

$$\text{If } A_j(t)=0, w_{ij} \leftarrow w_{ij} - \Delta\left[\frac{\psi'\left(\sum_j w_{ij}f_j(t)\right)}{1-\psi\left(\sum_j w_{ij}f_j(t)\right)}\right] f_i(t) - \text{sign}(w_{ij})\mu$$

where sign($w_{ij}$) represents sign of the $w_{ij}$, and $\psi'(x)$ denotes derivative of $\psi$ with respect to x. The term involving $\mu$ promotes sparsity.

Sparsity in the Algorithm:

In several situations, it may be preferred for the algorithm to return as few non-zero elements as possible. This can be done by setting up the maximum likelihood problem with a penalty for sparsity, as follows:

$$\text{Max } P(\text{data}/w) - \mu |w|_0$$

The $|w|_0$ norm captures the total number of non-zero $w_{ij}$. For certain aspects, the $l_0$ norm may be replaced with the $l_1$ norm, as follows:

$$\text{Max } P(\text{data}/w) - \mu |w|_1$$

The penalty term in this modified optimization introduces the term $-\text{sign}(w_{ij})\mu$ into the algorithm so that there is a tendency for the value of $w_{ij}$ to stay close to zero.

For the special choice of sigmoid function, the following update rule may be used:

$$\text{If } A_j(t)=1, w_{ij} \leftarrow w_{ij} + \Delta[1-\psi(\Sigma_j w_{ij}f_j(t))]f_i(t) - \text{sign}(w_{ij})\mu$$

$$\text{If } A_j(t)=0, w_{ij} \leftarrow w_{ij} - \Delta[1-\psi(\Sigma_j w_{ij}f_j(t))]f_i(t) - \text{sign}(w_{ij})\mu$$

At the end of the algorithm, values of the $w_{ij}$ be compared to a threshold to select the non-zero values which have influence on node j. These are declared to be the causal influences of node j. In addition, if the inferred value is positive, then it can be inferred that event j causes i to occur. If the inferred value is negative, it can be inferred that event j prevents i from occurring.

An Example Neural System

FIG. 11 illustrates an example neural system 1100 with multiple levels of neurons in accordance with certain aspects of the present disclosure. The neural system 1100 may comprise a level of neurons 1102 connected to another level of neurons 1106 though a network of synaptic connections 1104. For simplicity, only two levels of neurons are illustrated in FIG. 11, although fewer or more levels of neurons may exist in a typical neural system.

As illustrated in FIG. 11, each neuron in the level 1102 may receive an input signal 118 that may be generated by a plurality of neurons of a previous level (not shown in FIG. 11). The signal 1108 may represent an input current of the level 1102 neuron. This current may be accumulated on the neuron membrane to charge a membrane potential. When the membrane potential reaches its threshold value, the neuron may fire and generate an output spike to be transferred to the next level of neurons (e.g., the level 1106).

The transfer of spikes from one level of neurons to another may be achieved through the network of synaptic connections (or simply "synapses") 1104, as illustrated in FIG. 11. The synapses 1104 may receive output signals (i.e., spikes) from the level 1102 neurons, scale those signals according to adjustable synaptic weights $w_1^{(i,i+1)}, \ldots, w_P^{(i,i+1)}$ (where P is a total number of synaptic connections between the neurons of levels 1102 and 1106), and combine the scaled signals as an input signal of each neuron in the level 1106. Further, each of the synapses 1104 may be associated with a delay, i.e., a time for which an output spike of a neuron of level i reaches a soma of neuron of level i+1.

A neuron in the level 1106 may generate output spikes 1110 based on a corresponding combined input signal originating from one or more neurons of the level 1102. The output spikes 1110 may be then transferred to another level of neurons using another network of synaptic connections (not shown in FIG. 11).

The neural system 1100 may be emulated by an electrical circuit and utilized in a large range of applications, such as image and pattern recognition, machine learning, motor control, and alike. Each neuron in the neural system 1100 may be implemented as a neuron circuit or a neural processor. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 1104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Figure 2A:
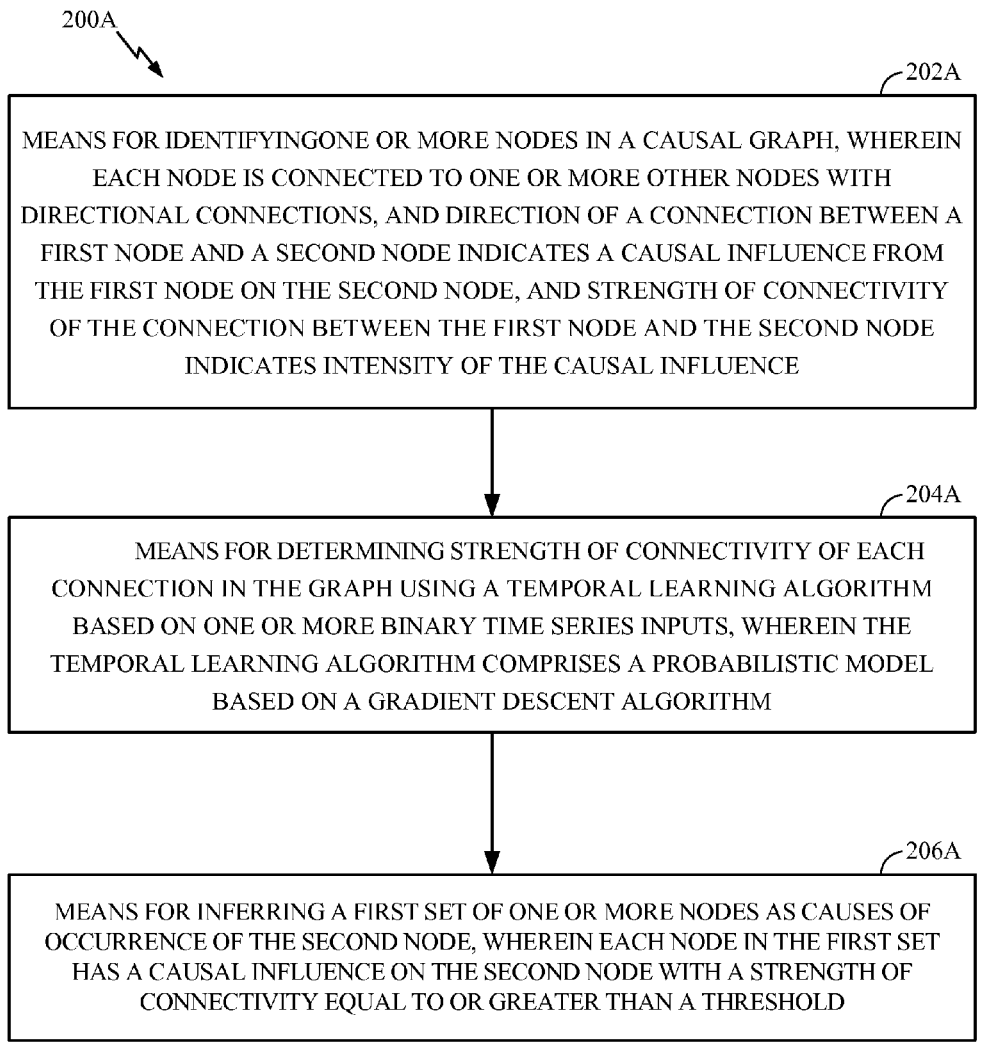
FIG. 2A illustrates example components capable of performing the operations illustrated in FIG. 2.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering. For example, operations 200 illustrated in FIG. 2 correspond to components 200A illustrated in FIG. 2A.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. For example, means for identifying, means for determining, means for inferring and means for updating may be any suitable processing element such as a processor or the like.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Bluray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/ or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A computer implemented method for inferring logical dependencies, comprising:
    identifying one or more nodes in a causal graph, wherein each node is connected to one or more other nodes with directional connections, and direction of a connection between a first node and a second node indicates a causal influence from the first node on the second node, and strength of connectivity of the connection between the first node and the second node indicates intensity of the causal influence;
    determining strength of connectivity of each connection in the causal graph using a temporal learning algorithm based on one or more binary time series inputs, wherein the temporal learning algorithm comprises a probabilistic model based on a gradient descent algorithm; and
    inferring a first set of the one or more nodes as causes of occurrence of the second node, wherein each node in the first set has a causal influence on the second node with strength of connectivity equal to or greater than a threshold; and
    outputting the causal graph with the directional connections.

2. The method of claim 1, wherein the strength of connectivity of each connection is updated iteratively.

3. The method of claim 1, further comprising:
    determining state of each node based on one or more incoming connections to the node using the probabilistic model.

4. The method of claim 1, wherein the determining strength of connectivity of each connection comprises:
    updating strength of connectivity of each connection based on the gradient descent algorithm such that logarithmic likelihood value of a corresponding node increases.

5. The method of claim 1, wherein the temporal learning algorithm comprises a sparsity constraint over strength of connectivity of incoming connections for each node.

6. The method of claim 1, wherein each node influences other nodes in a time window after its occurrence.

7. The method of claim 6, wherein influence on other nodes has an exponential decay in the time window.

8. The method of claim 1, wherein the strength of connectivity of each connection is updated once in a block of time.

9. The method of claim 8, wherein the updated strength of connectivity of each connection after the block of time is sum of one or more updated values for the strength of connectivity generated at every time step by the temporal learning algorithm.

10. The method of claim 1, wherein the temporal learning algorithm comprises one or more learning rules for at least one of sufficient causation, preventive causation or necessary causation, or combination thereof.

11. The method of claim 10, wherein a learning rule for sufficient causation comprises:
    at any time t, $$\text{if } E(t) = 1, b_i \leftarrow b_i + \Delta \frac{(1-\beta_{\setminus i})f_i(t)}{\beta_T}\beta_i(1-\beta_i)^2$$

$$\text{if } E(t) = 0, b_i \leftarrow b_i - \Delta \frac{f_i(t)}{1-\beta_i f_i(t)}\beta_i(1-\beta_i)^2$$

wherein $$\beta_i = \frac{\exp(b_i)}{1+\exp(b_i)},$$

$$\beta_T = \beta_1 f_1(t)|\beta_2 f_2(t)|...|\beta_n f_n(t),$$

$$\beta_{\setminus i} = \beta_1 f_1(t)|\beta_2 f_2(t)|...|\beta_{i-1}f_{i-1}(t)|\beta_{i+1}f_{i+1}(t)|...|\beta_n f_n(t),$$

wherein $\beta_i$ represents initial values for all i, exp(.) represents exponential function, $\Delta$ represents a learning parameter, $\beta_T$ represents total effect of sufficient causes on E, and $\beta_{\setminus i}$ represents a probability that an event $E_j$, happens due to reasons other than $A_i$ and $f_i(t)$ represents temporal persistence function.

12. The method of claim 10, wherein a learning rule for preventive causation comprises:
    at any time t, $$\text{if } E(t) = 1, g_i \leftarrow g_i - \Delta\left[\frac{f_i(t)}{1-\gamma_i f_i(t)} - \mu\right]\gamma_i(1-\gamma_i)^2$$

$$\text{if } E(t) = 0, g_i \leftarrow g_i + \Delta\left[\frac{\lambda(1-\gamma_{\setminus i})f_i(t)}{\gamma_T} - \mu\right]\gamma_i(1-\gamma_i)^2$$

wherein $$\gamma_i = \frac{\exp(g_i)}{1+\exp(g_i)},$$

$$1 - \gamma_T = \prod_j (1-\gamma_j f_j(t))$$

$$1 - \gamma_{\setminus i} = \prod_{j\neq i} (1-\gamma_j f_j(t))$$

wherein $\gamma_i$ represents initial values for all i, exp(.) represents exponential function, μ represents sparsity of a solution, Δ is a learning parameter, $\gamma_T$ is total preventive effect on E, and $\gamma_{\setminus i}$ is total preventive effect on E from nodes other than node i, and $f_i(t)$ represents temporal persistence function.

13. The method of claim 10, wherein a learning rule for necessary causation comprises:
at any time t, if $E(t) = 1$, $a_i \leftarrow a_i - \Delta \left[ \dfrac{\overline{f}_i(t)}{1 - \alpha_i f_i(t)} - \mu \right] \alpha_i (1 - \alpha_i)^2$ if $E(t) = 0$, $a_i \leftarrow a_i + \Delta \left[ \dfrac{\lambda(1 - \alpha_{\setminus i}) \overline{f}_i(t)}{\alpha_T} - \mu \right] \alpha_i (1 - \alpha_i)^2$ wherein $\alpha_i = \dfrac{\exp(a_i)}{1 + \exp(a_i)}$, $1 - \alpha_T = \prod_j (1 - \alpha_j \overline{f}_j(t))$ $1 - \alpha_{\setminus i} = \prod_{j \neq i} (1 - \alpha_j \overline{f}_j(t))$ wherein $\alpha_i$ represents initial values for all i, exp(.) represents exponential function, μ represents sparsity of a solution, Δ is a learning parameter, $\alpha_T$ represents total effect of necessary causes, and $\alpha_{\setminus i}$ represents total effect of necessary causes on an event E in absence of $\alpha_i$, and $f_i(t)$ represents temporal persistence function.

14. The method of claim 1, wherein the temporal learning algorithm infers causal relationships between nodes based on neural networks using the probabilistic model.

15. A computer implemented apparatus for inferring logical dependencies, comprising:
means for identifying one or more nodes in a causal graph, wherein each node is connected to one or more other nodes with directional connections, and direction of a connection between a first node and a second node indicates a causal influence from the first node on the second node, and strength of connectivity of the connection between the first node and the second node indicates intensity of the causal influence;
means for determining strength of connectivity of each connection in the causal graph using a temporal learning algorithm based on one or more binary time series inputs, wherein the temporal learning algorithm comprises a probabilistic model based on a gradient descent algorithm; and
means for inferring a first set of one or more nodes as causes of occurrence of the second node, wherein each node in the first set has a causal influence on the second node with strength of connectivity equal to or greater than a threshold.

16. The apparatus of claim 15, wherein the strength of connectivity of each connection is updated iteratively.

17. The apparatus of claim 15, further comprising:
means for determining state of each node based on one or more incoming connections to the node using the probabilistic model.

18. The apparatus of claim 15, wherein the means for determining strength of connectivity of each connection comprises:
means for updating strength of connectivity of each connection based on the gradient descent algorithm such that logarithmic likelihood value of a corresponding node increases.

19. The apparatus of claim 15, wherein the temporal learning algorithm comprises a sparsity constraint over strength of connectivity of incoming connections for each node.

20. The apparatus of claim 15, wherein each node influences other nodes in a time window after its occurrence.

21. The apparatus of claim 20, wherein influence on other nodes has an exponential decay in the time window.

22. The apparatus of claim 15, wherein the strength of connectivity of each connection is updated once in a block of time.

23. The apparatus of claim 22, wherein the updated strength of connectivity of each connection after the block of time is sum of one or more updated values for the strength of connectivity generated at every time step by the temporal learning algorithm.

24. The apparatus of claim 15, wherein the temporal learning algorithm comprises one or more learning rules for at least one of sufficient causation, preventive causation or necessary causation, or combination thereof.

25. The apparatus of claim 24, wherein a learning rule for sufficient causation comprises:
at any time t, if $E(t) = 1$, $b_i \leftarrow b_i + \Delta \dfrac{(1 - \beta_{\setminus i}) f_i(t)}{\beta_T} \beta_i (1 - \beta_i)^2$ if $E(t) = 0$, $b_i \leftarrow b_i - \Delta \dfrac{f_i(t)}{1 - \beta_i f_i(t)} \beta_i (1 - \beta_i)^2$ wherein $\beta_i = \dfrac{\exp(b_i)}{1 + \exp(b_i)}$, $\beta_T = \beta_1 f_1(t) | \beta_2 f_2(t) | \ldots | \beta_n f_n(t)$, $\beta_{\setminus i} = \beta_1 f_1(t) | \beta_2 f_2(t) | \ldots | \beta_{i-1} f_{i-1}(t) | \beta_{i+1} f_{i+1}(t) | \ldots | \beta_n f_n(t)$, wherein $\beta_i$ represents initial values for all i, exp(.) represents exponential function, Δ represents a learning parameter, $\beta_T$ represents total effect of sufficient causes on E, and $\beta_{\setminus i}$ represents a probability that an event $E_i$ happens due to reasons other than $A_i$ and $f_i(t)$ represents temporal persistence function.

26. The apparatus of claim 24, wherein a learning rule for preventive causation comprises:
at any time t, if $E(t) = 1$, $g_i \leftarrow g_i - \Delta \left[ \dfrac{f_i(t)}{1 - \gamma_i f_i(t)} - \mu \right] \gamma_i (1 - \gamma_i)^2$ if $E(t) = 0$, $g_i \leftarrow g_i + \Delta \left[ \dfrac{\lambda(1 - \gamma_{\setminus i}) f_i(t)}{\gamma_T} - \mu \right] \gamma_i (1 - \gamma_i)^2$ wherein $\gamma_i = \dfrac{\exp(g_i)}{1 + \exp(g_i)}$, $1 - \gamma_T = \prod_j (1 - \gamma_j f_j(t))$ $1 - \gamma_{\setminus i} = \prod_{j \neq i} (1 - \gamma_j f_j(t))$ wherein $\gamma_i$ represents initial values for all i, exp(.) represents exponential function, μ represents sparsity of a solution, Δ is a learning parameter, $\gamma_T$ is total preventive effect on E, and $\gamma_{\setminus i}$ is total preventive effect on E from nodes other than node i, and $f_i(t)$ represents temporal persistence function.

27. The apparatus of claim 24, wherein a learning rule for necessary causation comprises:
at any time t, if $E(t) = 1$, $a_i \leftarrow a_i - \Delta \left[ \dfrac{\overline{f}_i(t)}{1 - \alpha_i f_i(t)} - \mu \right] \alpha_i (1 - \alpha_i)^2$ if $E(t) = 0$, $a_i \leftarrow a_i + \Delta \left[ \dfrac{\lambda(1 - \alpha_{\setminus i})\overline{f}_i(t)}{\alpha_T} - \mu \right] \alpha_i (1 - \alpha_i)^2$ wherein $\alpha_i = \dfrac{\exp(a_i)}{1 + \exp(a_i)}$, $1 - \alpha_T = \prod_j (1 - \alpha_j \overline{f}_j(t))$ $1 - \alpha_{\setminus i} = \prod_{j \neq i} (1 - \alpha_j \overline{f}_j(t))$ wherein $\alpha_i$ represents initial values for all i, exp(.) represents exponential function, μ represents sparsity of a solution, Δ is a learning parameter, $\alpha_T$ represents total effect of necessary causes, and $\alpha_{\setminus i}$ represents total effect of necessary causes on an event E in absence of $\alpha_i$, and $f_i(t)$ represents temporal persistence function.

28. The apparatus of claim 15, wherein the temporal learning algorithm infers causal relationships between nodes based on neural networks using the probabilistic model.

29. A computer-program product for inferring logical dependencies, comprising a non-transitory computer readable medium having instructions stored thereon, the instructions being executable by one or more processors and the instructions comprising:
instructions for identifying one or more nodes in a causal graph, wherein each node is connected to one or more other nodes with directional connections, and direction of a connection between a first node and a second node indicates a causal influence from the first node on the second node, and strength of connectivity of the connection between the first node and the second node indicates intensity of the causal influence;
instructions for determining strength of connectivity of each connection in the causal graph using a temporal learning algorithm based on one or more binary time series inputs, wherein the temporal learning algorithm comprises a probabilistic model based on a gradient descent algorithm; and
instructions for inferring a first set of one or more nodes as causes of occurrence of the second node, wherein each node in the first set has a causal influence on the second node with strength of connectivity equal to or greater than a threshold.

30. An apparatus for inferring logical dependencies, comprising: at least one processor configured to:
identify one or more nodes in a causal graph, wherein each node is connected to one or more other nodes with directional connections, and direction of a connection between a first node and a second node indicates a causal influence from the first node on the second node, and strength of connectivity of the connection between the first node and the second node indicates intensity of the causal influence,
determine strength of connectivity of each connection in the causal graph using a temporal learning algorithm based on one or more binary time series inputs, wherein the temporal learning algorithm comprises a probabilistic model based on a gradient descent algorithm, and
infer a first set of one or more nodes as causes of occurrence of the second node, wherein each node in the first set has a causal influence on the second node with strength of connectivity equal to or greater than a threshold; and
a memory coupled to the at least one processor.

* * * * *